(12) United States Patent
Matyac

(10) Patent No.: US 10,498,166 B2
(45) Date of Patent: Dec. 3, 2019

(54) METHOD AND APPARATUS FOR SWITCHING A LOAD BETWEEN TWO POWER SOURCES

(71) Applicant: Mark Matyac, Lawrenceville, GA (US)

(72) Inventor: Mark Matyac, Lawrenceville, GA (US)

( * ) Notice: Subject to any disclaimer, the term of this patent is extended or adjusted under 35 U.S.C. 154(b) by 177 days.

(21) Appl. No.: 15/825,644

(22) Filed: Nov. 29, 2017

(65) Prior Publication Data

US 2019/0165603 A1    May 30, 2019

(51) Int. Cl.
*H02J 9/06* (2006.01)

(52) U.S. Cl.
CPC .......... *H02J 9/062* (2013.01); *H02J 2009/068* (2013.01)

(58) Field of Classification Search
CPC ........................... H02J 9/062; H02J 2009/068
See application file for complete search history.

(56) References Cited

U.S. PATENT DOCUMENTS

| | | | |
|---|---|---|---|
| 5,027,051 A | 6/1991 | Lafferty | |
| 5,270,636 A | 12/1993 | Lafferty | |
| 6,188,145 B1 | 2/2001 | Stewart | |
| 6,914,418 B2 | 7/2005 | Sung | |
| 7,843,085 B2 | 11/2010 | Ledenev et al. | |
| 7,929,327 B2 * | 4/2011 | Haines | H02J 9/062 |
| | | | 363/106 |
| 2005/0077879 A1 | 4/2005 | Near | |
| 2009/0152947 A1 | 6/2009 | Wang | |
| 2011/0115295 A1 * | 5/2011 | Moon | H02J 3/32 |
| | | | 307/65 |
| 2011/0133558 A1 | 6/2011 | Park | |
| 2011/0148205 A1 * | 6/2011 | Moon | H02J 3/32 |
| | | | 307/65 |
| 2012/0044014 A1 | 2/2012 | Stratakos et al. | |
| 2012/0098350 A1 | 4/2012 | Campanella et al. | |
| 2014/0084687 A1 | 3/2014 | Dent | |
| 2016/0164295 A1 | 6/2016 | Cheng et al. | |
| 2017/0264212 A1 | 9/2017 | Muguerza Olcoz et al. | |
| 2017/0317501 A1 * | 11/2017 | Moriyama | H02J 3/38 |

OTHER PUBLICATIONS

WIPO: "Notification of Transmittal of the International Search Report and the Written Opinion of the International Searching Authority, or the Declaration"; PCT dated Feb. 8, 2019.
Maehlum, Mathias Aarre: "Grid-Tied, Off-Grid and Hybrid Solar Systems", Aug. 14, 2013, Energy Informative (downloaded from http://energyinformative.org/grid-tied-off-grid-and-hybrid-solar-systems/).

* cited by examiner

*Primary Examiner* — Jared Fureman
*Assistant Examiner* — Duc M Pham
(74) *Attorney, Agent, or Firm* — Bryan W. Bockhop; Bockhop Intellectual Property Law, LLC

(57) ABSTRACT

In an apparatus for selectively coupling a load to a grid power source and an inverter that is fed electric power by an alternate power source, a node is coupled to the load. A grid sensor senses the grid power source. A grid relay selectively couples grid power to the node. An inverter relay also selectively couples the inverter to node. A controller closes the grid relay and the inverter relay when grid power is available. The controller opens the grid relay when grid power is not available. The controller opens the inverter relay when grid power is not available and when feedback indicates that the grid relay is closed.

20 Claims, 4 Drawing Sheets

METHOD AND APPARATUS FOR SWITCHING A LOAD BETWEEN TWO POWER SOURCES

BACKGROUND OF THE INVENTION

1. Field of the Invention

The present invention relates to power management systems and, more specifically, for a system managing

2. Description of the Related Art

Alternative energy sources, including solar power sources, are increasingly being used to power loads such as home and office electrical systems, which also receive electric power from the power grid. Typically, the alternative energy source produces direct current (DC) power that is fed to an inverter, which converts it to alternating current (AC) power and synchronizes the AC power with power on the grid. When the alternative energy source produces more power than is consumed by the load, excess power is delivered to the power grid. When the alternative energy source produces less power than is consumed by the load, the load takes power from the power grid in addition to that from the alternative power source.

Sometimes, the load gets disconnected from the power grid as a result of such events as fallen power lines. Typically, when this happens, the inverter is disconnected from the power grid to prevent hazards from alternative energy sourced power on the fallen lines. Unfortunately, when the inverter is disconnected from the grid, it is also disconnected from the load. Thus, the home or office will be without electric power, even though it could otherwise still be generated locally by the alternative energy source.

Therefore, there is a need for an apparatus that disconnects an alternative energy source from the power grid while still supplying power to the load when the power grid fails.

SUMMARY OF THE INVENTION

The disadvantages of the prior art are overcome by the present invention which, in one aspect, is an apparatus for selectively coupling a load to a grid power source and an inverter that is fed electric power by an alternate power source. A first node is configured to be coupled to the load. A grid sensor senses a state of the grid power source. A grid relay couples the grid power source to the first node when in a closed state and decouples the grid power source from the first node when in an open state. An inverter relay couples the inverter to the first node when in a closed state and decouples the inverter from the first node when in an open state. A controller is responsive to the grid sensor and is programmed to: (i) cause the grid relay to be in the closed state and cause the inverter relay to be in the closed state when the grid sensor indicates power is available from the grid; (ii) cause the grid relay to be in the open state when the grid sensor indicates that power is not available from the grid; and (iii) cause the inverter relay to be in the open state when the grid sensor indicates power is not available from the grid and when feedback from the grid relay indicates that the grid relay is in the closed state.

In another aspect, the invention is a system for selectively coupling a load to a grid power source that delivers power on a first grid power line and a second grid power line that is 180° out of phase with the first power line and an inverter that is fed electric power by an alternate power source and that delivers power on a first inverter power line and a second inverter power line that is 180° out of phase with the first power line. A first sub-node is configured to be coupled to a first phase contact of the load and a second sub-node is configured to be coupled to a second phase contact of the load. A first grid sensor senses a state of the first grid power line and a second grid sensor senses a state of the second grid power line. A grid relay selectively couples the first grid power line to the first sub-node and the second grid power line to the second sub-node. An inverter relay selectively couples the first inverter power line to the first sub-node and the second inverter power line to the second sub-node. A controller that receives feedback from the grid relay and is responsive to the grid sensor and is programmed to: (i) cause the grid relay to couple the first grid power line to the first sub-node and the second grid power line to the second sub-node when the first grid sensor indicates power is available from the first grid power line and from the second grid power line; (ii) cause the grid relay to decouple the first grid power line from the first sub-node and the second grid power line from the second sub-node when the first grid sensor indicates power is not available from the first grid power line and from the second grid power line; and (iii) cause the inverter relay to decouple the first inverter power line from the first sub-node the second inverter power line from the second sub-node when the first grid sensor indicates power is not available from the first grid power line and from the second grid power line and when the feedback from the grid relay indicates that the either the first grid power line is coupled to the first sub-node or the second grid power line is coupled to the second sub-node.

In yet another aspect, the invention is a method of switching a load between a grid power source and an alternative power source, in which a state of the grid power source is sensed. If the sensing step indicates that power is available from the grid power source then both the grid power source and the alternative power source are coupled to the load. If the sensing step indicates that power is not available from the grid power source then the grid power source is decoupled from the load. Whether the grid power source is decoupled from the load after the step of decoupling the grid power source from the load is sensed. If the grid power source is decoupled from the load, then the alternative power source is coupled to the load. If grid power is not available and the grid power source is coupled to the load, then the alternative power source is decoupled from the load.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
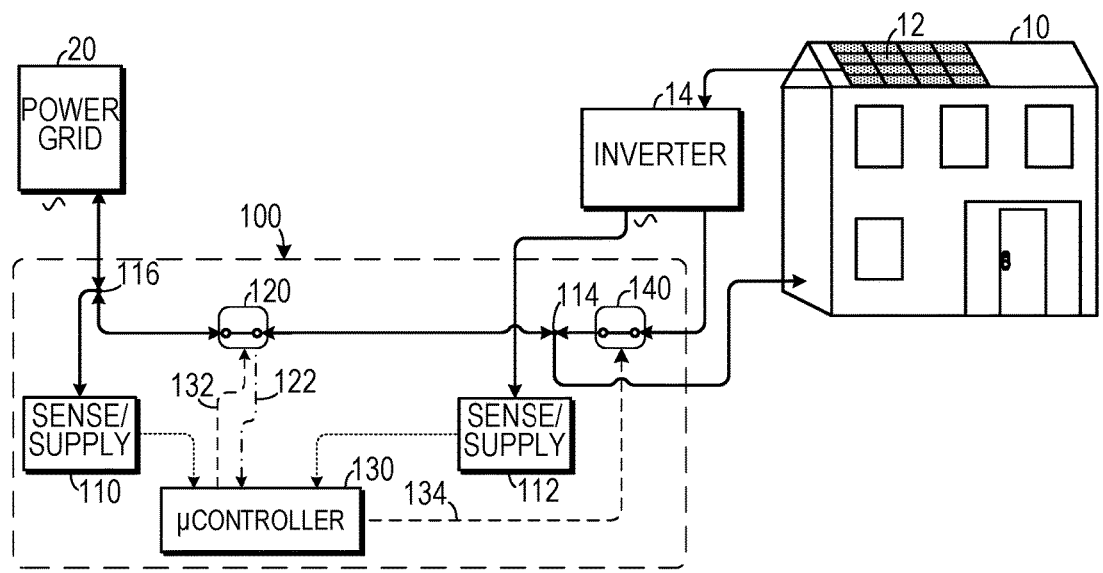
FIGS. 1A-1C are schematic diagrams of one embodiment of a switching apparatus demonstrating three modes of operation.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of an apparatus 100 for switching a load 10 (such as a breaker box busbar in a house or office) between a grid power source 20 and an alternative power source 12 (such as a photovoltaic system, a wind power system, a hydroelectric power system, a thermoelectric power system, etc.) employs an inverter 14 to transform direct current power into alternating current power that is in matched in phase with power from the grid power source 20. The apparatus 100 employs a grid relay 120 that selectively couples the grid power source 20, via a second node 116, to a first node 114. An inverter relay 140 (which could be one of many commonly-known controllable power relays rated to handle the expected current that would flow therethrough) selectively couples the inverter 14 to the first node 114. The first node 114 is coupled to the load 10 and, under normal operating conditions (as shown in FIG. 1A), the grid relay 120 and the inverter relay 140 will remain in a closed state so that power from both the power grid 20 and the inverter 14 can feed the load 10 and so that excess power from the inverter 14 can be fed to the power grid 20.

The grid relay 120 and the inverter relay 114 are both controlled by a microcontroller 130 (such as, in one representative embodiment, an MSP430-series microcontroller available from Texas Instruments), which receives power from both the grid power supply 110 (fed by the grid power source 20) and an inverter power supply 112 (fed by the inverter 14). Thus, if one of the grid power source 20 or the inverter 14 fails, the microcontroller 130 will still have power from the other.

Figure 1B:
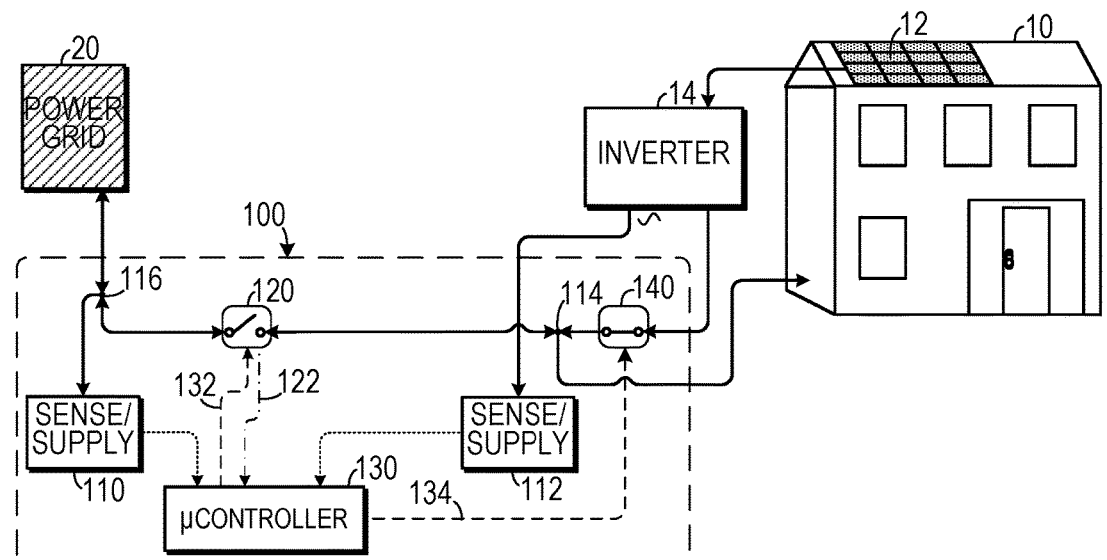

If, as shown in FIG. 1B, the voltage from the grid power supply 110 falls below a predetermined threshold (indicating grid power failure), then the microcontroller 130 will assert a, open signal on a grid relay line 132, thereby causing the grid relay 120 to open, thereby decoupling the power grid 20 from the first node 114. Feedback 122 from the grid relay 120 indicates if the grid relay 120 is in an open state and, if so, then the inverter relay 140 remains closed and power from the inverter 14 is fed to the load 10. Thus, the alternate power source 12 can still be used to meet the power requirements of the load 10 in the event of a grid power failure. Because the grid relay 120 decouples the first node from the grid power source 12 in this situation, no power from the inverter 14 is fed back to the power grid 20.

Figure 1C:
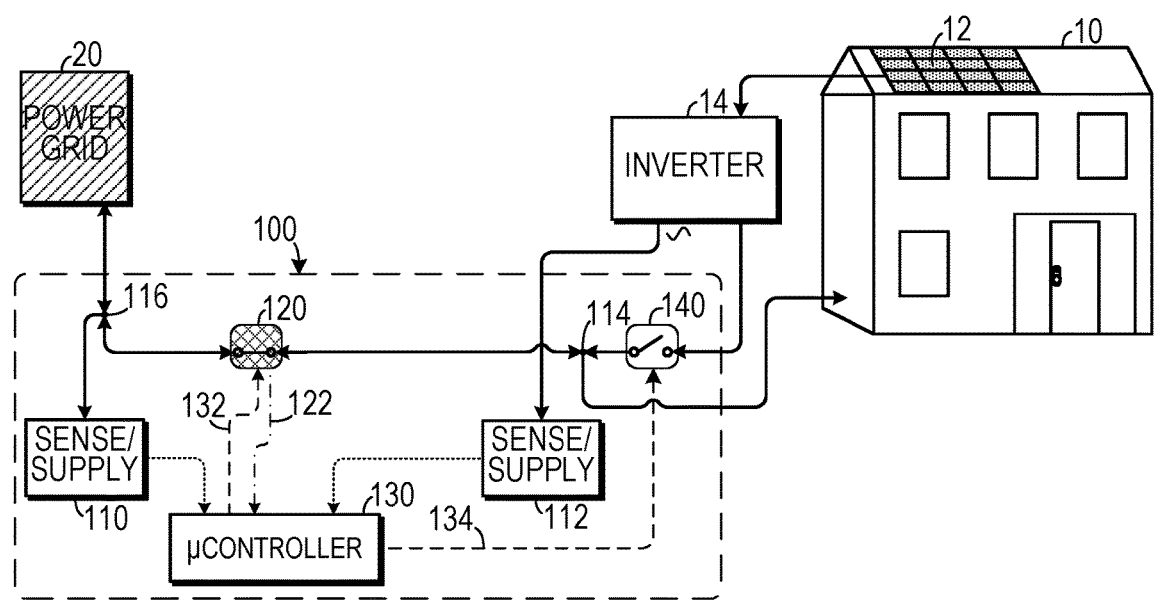

As shown in FIG. 1C, if feedback 122 from the grid relay 120 indicates that the grid relay 120 failed to open properly (indicating a failure of the grid relay 120) while at the same time power from the grid power supply 110 is below the threshold, then the microcontroller 130 will assert an open signal 134 causing the inverter relay 140 to open, thereby isolating the inverter 14 from the first node 114 so that inverter power is not fed onto either the power grid 20 or the load 10.

Figure 2:
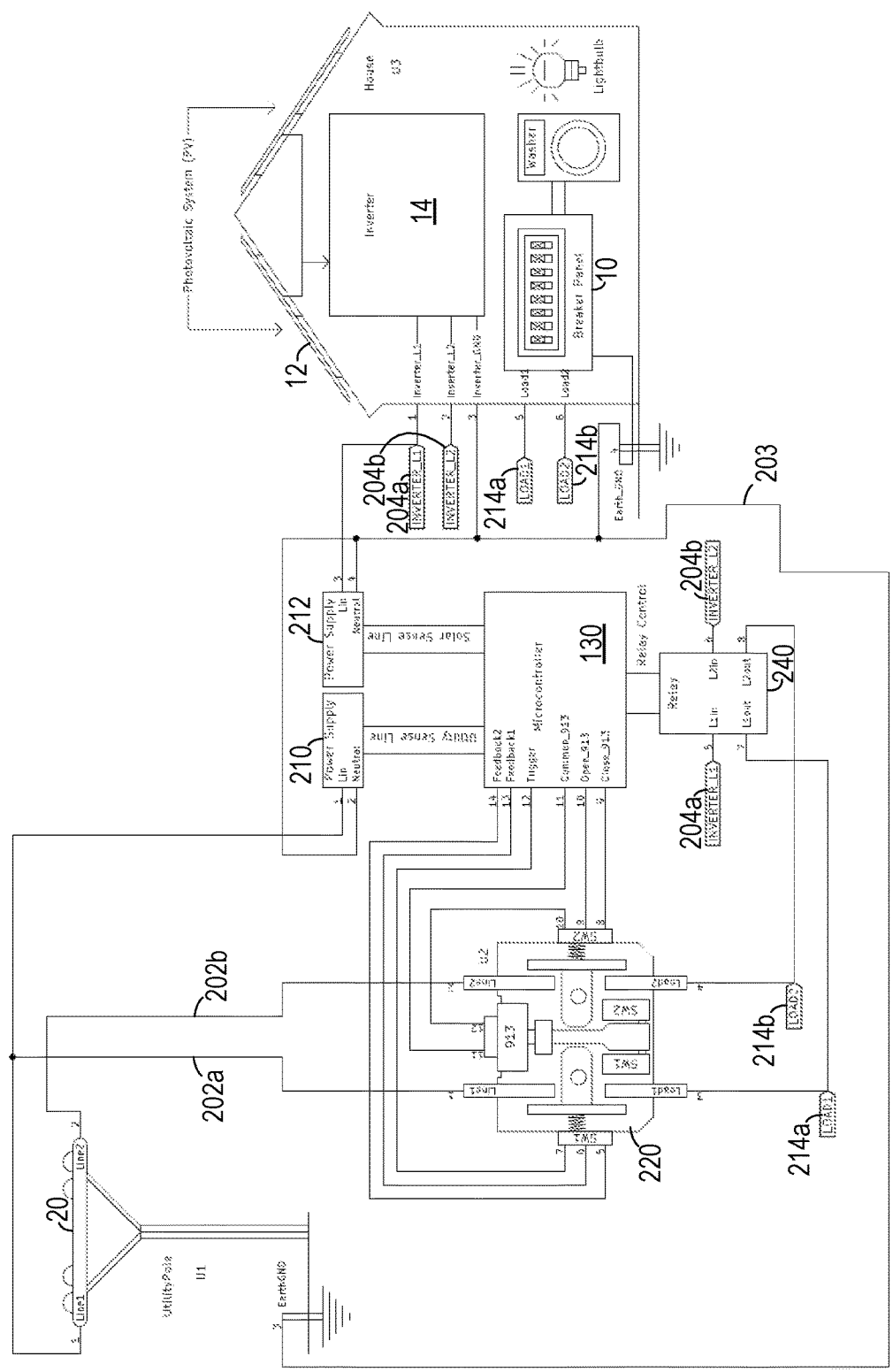
FIG. 2 is a schematic diagram on one commercial embodiment employed with a photovoltaic system.

As shown in FIG. 2, one commercial embodiment can be used in a system in which the grid power source 20 includes a first grid power line 202a and a second grid power line 202b that is 180° out of phase with the first grid power line 202a, both of which have a voltage relative to a common ground line 203. The inverter 14 delivers power on a first inverter power line 204a and a second inverter power line 204b that is 180° out of phase with the first power line 204a, both of which are in phase with the power from the grid power source 20. The microcontroller 130 is powered by a grid power supply 210 and an inverter power supply 212. The microcontroller 130 controls a two-line relay 220, which selectively couples the first grid power line 202a to a first sub-node 214a and second grid power line 202b to a second sub-node 214b. The inverter relay 240 selectively couples the first inverter power line 204a to a first sub-node 214a and second inverter power line 204b to a second sub-node 214b.

Figure 3A:
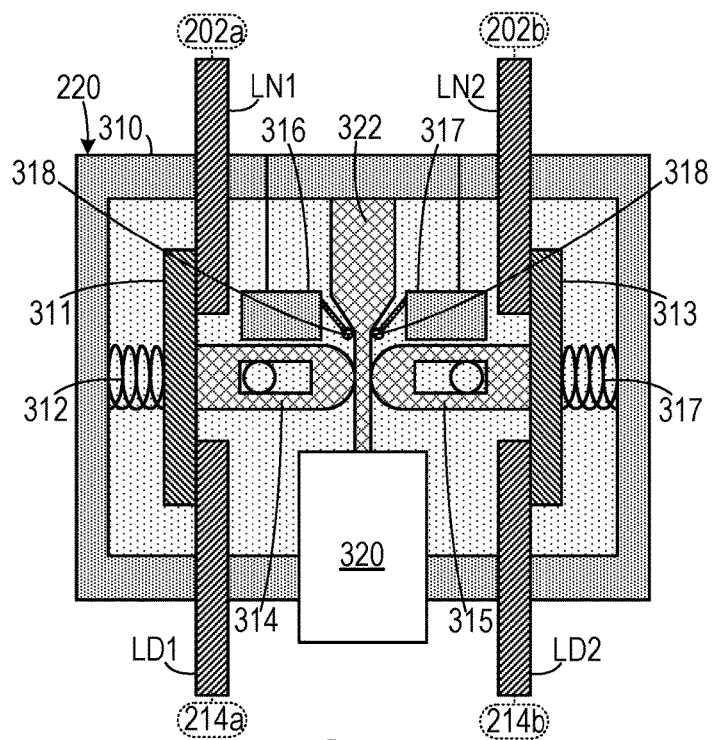
FIGS. 3A-3B are schematic diagrams of a grid relay in two different states.
Figure 3B:
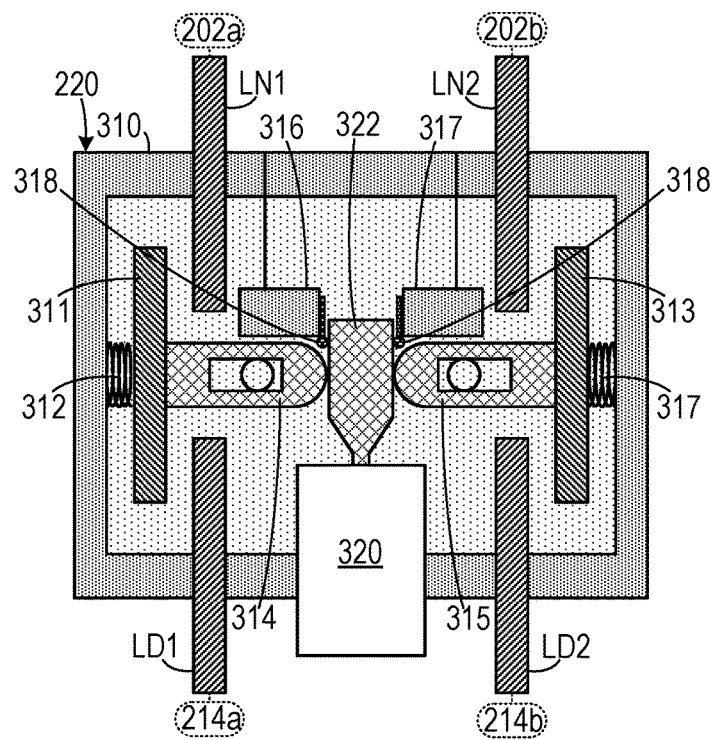

As shown in FIGS. 3A-3B, one embodiment of a grid power relay 220 includes a housing 310, which in one embodiment includes an injection-molded plastic. A first grid contact LN1 (that is coupled to the first grid power line 202a) and a second grid contact LN2 (that is coupled to the second grid power line 202b) are held in a fixed relationship with the housing 310. Similarly, a first load contact LD1 (that is coupled to the first sub-node 214a) and a second load contact LD2 (that is coupled to the second sub-node 214b) are held in a fixed relationship with the housing. A first moving contact first inverter contact 311 is in a movable relationship with the housing and movable between contacting both the first grid contact LN1 and the first load contact LD1, thereby selectively electrically coupling the first grid contact LN1 to the first load contact LD1. A first spring 312 pushes the first moving contact 311 toward the first grid contact LN1 and the first load contact LD1. A first arm 314 is in sliding relationship along a first direction relative to the housing 310 and is coupled to the first moving contact 311. Similarly, a second moving contact second inverter contact 313 is in a movable relationship with the housing and movable between contacting both the second grid contact LN2 and the second load contact LD2, thereby selectively electrically coupling the second grid contact LN2 to the second load contact LD2. A second spring 317 pushes the second moving contact 313 toward the second grid contact LN2 and the second load contact LD2. A second arm 315 is in sliding relationship along a second direction relative to the housing 310 and is coupled to the second moving contact 313.

A plunger 322 has a first position (as shown in FIG. 3A) which allows the first spring 312 to push the first moving contact 311 into a closed position that electrically couples first grid contact LN1 to the first load contact LD1 and that allows the second spring 317 to push the second moving contact 313 into a closed position that electrically couples second grid LN2 contact to the second load contact LD2. The plunger 322 also has a second position (as shown in FIG. 3B) which pushes the first arm 314 and the first moving contact 311 into an open position that electrically decouples first grid contact LN1 from the first load contact LD1 and that pushes the second arm 315 and the second moving contact 313 into an open position that electrically decouples second grid contact LN2 from the second load contact LD2. A driving mechanism 320, which can include a solenoid to apply mechanical force to the plunger 322, selectively moves the plunger 322 between the first position and the second position. A sensor system, such as a first microswitch 316, senses if the plunger 322 is in the first position or in the second position. This information is shared with the microcontroller to indicate if the relay 220 is in the open state or the closed state when grid power is not available. A second micro-switch 317 provides state information about the plunger 322 so that voltage of the proper polarity is applied to the driving mechanism when it changes the state of the plunger 322. The first micro-switch 316 and the second micro-switch 317 each include a probe 318 that is in contact with the plunger 322 and that moves as the plunger 322 moves.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An apparatus for selectively coupling a load to a grid power source and an inverter that is fed electric power by an alternate power source, comprising:
    (a) a first node, configured to be coupled to the load;
    (b) a grid sensor that senses a state of the grid power source;
    (c) a grid relay that couples the grid power source to the first node when in a closed state and that decouples the grid power source from the first node when in an open state;
    (d) an inverter relay that couples the inverter to the first node when in a closed state and that decouples the inverter from the first node when in an open state; and
    (e) a controller that is responsive to the grid sensor and that is programmed to:
        (i) cause the grid relay to be in the closed state and cause the inverter relay to be in the closed state when the grid sensor indicates power is available from the grid;
        (ii) cause the grid relay to be in the open state when the grid sensor indicates that power is not available from the grid; and
        (iii) cause the inverter relay to be in the open state when the grid sensor indicates power is not available from the grid and when feedback from the grid relay indicates that the grid relay is in the closed state.

2. An apparatus for selectively coupling a load to a grid power source and an inverter that is fed electric power by an alternate power source, comprising:
    (a) a first node, configured to be coupled to the load;
    (b) a grid sensor that senses a state of the grid power source;
    (c) a grid relay that couples the grid power source to the first node when in a closed state and that decouples the grid power source from the first node when in an open state;
    (d) an inverter relay that couples the inverter to the first node when in a closed state and that decouples the inverter from the first node when in an open state; and
    (e) a controller that is responsive to the grid sensor and that is programmed to:
        (i) cause the grid relay to be in the closed state and cause the inverter relay to be in the closed state when the grid sensor indicates power is available from the grid;
        (ii) cause the grid relay to be in the open state when the grid sensor indicates that power is not available from the grid; and
        (iii) cause the inverter relay to be in the open state when the grid sensor indicates power is not available from the grid and when feedback from the grid relay indicates that the grid relay is in the closed state,
    wherein the grid power source includes a first grid power line and a second grid power line that is 180° out of phase with the first power line and wherein the inverter delivers power on a first inverter power line and a second inverter power line that is 180° out of phase with the first power line and wherein the grid relay comprises:
        (i.) a housing;
        (ii.) a first grid contact in a fixed relationship with the housing and a second grid contact in a fixed relationship with the housing;
        (iii.) a first load contact in a fixed relationship with the housing and a second load contact in a fixed relationship with the housing;
        (iv.) a first moving contact in a movable relationship with the housing and movable between contacting both the first grid contact and the first load contact, thereby electrically coupling the first grid contact to the first load contact, and not contacting at least one of the first grid contact and the first load contact, thereby electrically decoupling the first grid contact from the first load contact, and a second moving contact in a movable relationship with the housing and movable between contacting both the second grid contact and the second load contact, thereby electrically coupling the second grid contact to the second load contact, and not contacting at least one of the second grid contact and the second load contact, thereby electrically decoupling the second grid contact from the second load contact; and
        (v.) a state mechanism that forces the first moving contact to electrically couple the first grid contact to the first load contact and simultaneously forces the second moving contact to electrically couple the second grid contact to the second load contact thereby driving the grid relay into the closed state and that forces the first moving contact to electrically decouple couple the first grid contact from the first load contact and simultaneously forces the second moving contact to electrically decouple the second grid contact to the second load contact thereby driving the grid relay into the open state.

3. The apparatus of claim 2, wherein the alternate power source comprises an alternative power source selected from a list consisting of: a photovoltaic system, a wind power system, a hydroelectric power system, a thermoelectric power system, and combinations thereof.

4. The apparatus of claim 2, wherein the state mechanism comprises:
    (e) a first spring that pushes the first moving contact toward the first grid contact and the first load contact and a second spring that pushes the first moving contact toward the second grid contact and the second load contact;
    (f) a first arm in sliding relationship along a first direction relative to the housing and coupled to the first moving contact and a second arm in sliding relationship along a second direction relative to the housing and coupled to the second moving contact;
    (g) a plunger that has a first position which allows the first spring to push the first moving contact into a closed position that electrically couples first grid contact to the first load contact and that allows the second spring to push the second moving contact into a closed position that electrically couples second grid contact to the second load contact, the plunger also having a second position which pushes the first moving contact into an open position that electrically decouples first grid contact from the first load contact and that pushes the second moving contact into an open position that electrically decouples second grid contact from the second load contact;
(h) a driving mechanism that selectively moves the plunger between the first position and the second position; and
(i) a sensor system that senses if the plunger is in the first position or in the second position.

5. The apparatus of claim 4, wherein the driving mechanism comprises a solenoid.

6. The apparatus of claim 4, wherein the sensor system includes a first micro-switch that includes a first probe in contact with the plunger and a second micro-switch that includes a second probe in contact with the plunger.

7. The apparatus of claim 6, wherein the controller feeds power to the first micro-switch and to the second micro-switch, and wherein the controller receives a first feedback signal from the first micro-switch and wherein the driving mechanism receives feedback from the second micro-switch.

8. The apparatus of claim 7, wherein the controller is programmed to cause the inverter relay to be in the open state when the grid sensor indicates that power is not available from the grid and when the first micro-switch indicates that the first moving contact and the second moving contact are in the closed position.

9. The apparatus of claim 2, further comprising:
(e) a first power supply that supplies power to the controller from the power grid; and
(f) a second power supply that supplies power to the controller from the inverter.

10. The apparatus of claim 2, wherein the controller is programmed to cause the grid relay to be in the open state when voltage from the first power supply falls below a predetermined threshold.

11. A system for selectively coupling a load to a grid power source that delivers power on a first grid power line and a second grid power line that is 180° out of phase with the first power line and an inverter that is fed electric power by an alternate power source and that delivers power on a first inverter power line and a second inverter power line that is 180° out of phase with the first power line, comprising:
(e) a first sub-node, configured to be coupled to a first phase contact of the load and a second sub-node, configured to be coupled to a second phase contact of the load;
(f) a first grid sensor that senses a state of the first grid power line and a second grid sensor that senses a state of the second grid power line;
(g) a grid relay that selectively couples the first grid power line to the first sub-node and the second grid power line to the second sub-node;
(h) an inverter relay that selectively couples the first inverter power line to the first sub-node and the second inverter power line to the second sub-node;
(i) a controller that receives feedback from the grid relay and is responsive to the grid sensor and that is programmed to:
(i) cause the grid relay to couple the first grid power line to the first sub-node and the second grid power line to the second sub-node when the first grid sensor indicates power is available from the first grid power line and from the second grid power line;
(ii) cause the grid relay to decouple the first grid power line from the first sub-node and the second grid power line from the second sub-node when the first grid sensor indicates power is not available from the first grid power line and from the second grid power line; and
(iii) cause the inverter relay to decouple the first inverter power line from the first sub-node the second inverter power line from the second sub-node when the first grid sensor indicates power is not available from the first grid power line and from the second grid power line and when the feedback from the grid relay indicates that the either the first grid power line is coupled to the first sub-node or the second grid power line is coupled to the second sub-node.

12. The system of claim 11, wherein the alternate power source comprises an alternative power source selected from a list consisting of: a photovoltaic system, a wind power system, a hydroelectric power system, a thermoelectric power system, and combinations thereof.

13. The system of claim 11, wherein the grid relay comprises:
(e) a housing;
(f) a first grid contact in a fixed relationship with the housing and a second grid contact in a fixed relationship with the housing;
(g) a first load contact in a fixed relationship with the housing and a second load contact in a fixed relationship with the housing;
(h) a first moving contact in a movable relationship with the housing and movable between contacting both the first grid contact and the first load contact, thereby electrically coupling the first grid contact to the first load contact, and not contacting at least one of the first grid contact and the first load contact, thereby electrically decoupling the first grid contact from the first load contact, and a second moving contact in a movable relationship with the housing and movable between contacting both the second grid contact and the second load contact, thereby electrically coupling the second grid contact to the second load contact, and not contacting at least one of the second grid contact and the second load contact, thereby electrically decoupling the second grid contact from the second load contact;
(i) a state mechanism that forces the first moving contact to electrically couple the first grid contact to the first load contact and simultaneously forces the second moving contact to electrically couple the second grid contact to the second load contact thereby driving the grid relay into the closed state and that forces the first moving contact to electrically decouple couple the first grid contact from the first load contact and simultaneously forces the second moving contact to electrically decouple the second grid contact to the second load contact thereby driving the grid relay into the open state; and
(j) a sensor system that senses if the plunger is in the first position or in the second position.

14. The system of claim 13, wherein the state mechanism comprises:
(e) a first spring that pushes the first moving contact toward the first grid contact and the first load contact and a second spring that pushes the first moving contact toward the second grid contact and the second load contact;
(f) a first arm in sliding relationship along a first direction relative to the housing and coupled to the first moving contact and a second arm in sliding relationship along a second direction relative to the housing and coupled to the second moving contact;
(g) a plunger that has a first position which allows the first spring to push the first moving contact into a closed position that electrically couples first grid contact to the first load contact and that allows the second spring to push the second moving contact into a closed position that electrically couples second grid contact to the second load contact, the plunger also having a second position which pushes the first moving contact into an open position that electrically decouples first grid contact from the first load contact and that pushes the second moving contact into an open position that electrically decouples second grid contact from the second load contact; and
(h) a driving mechanism that selectively moves the plunger between the first position and the second position.

15. The system of claim 14, wherein the driving mechanism comprises a solenoid.

16. The system of claim 14, wherein the sensor system comprises a first micro-switch that includes a first probe in contact with the plunger, wherein the controller feeds power to the first micro-switch and wherein the controller receives a first feedback signal from the first micro-switch indicative of whether the first moving contact and the second moving contact are in the open position or the closed position, wherein the controller is programmed to cause the inverter relay decouple the first inverter power line from the first sub-node and the second inverter power line from the second sub-node when the first micro-switch indicates that the first moving contact and the second moving contact are in the closed position when power is not available from the power grid.

17. The system of claim 11, further comprising:
(e) a first power supply that supplies power to the controller from the power grid; and
(f) a second power supply that supplies power to the controller from the inverter.

18. The system of claim 11, wherein the controller is programmed to cause the grid relay to decouple the first grid power line from the first sub-node and the second grid power line from the second sub-node when voltage from the first power supply falls below a predetermined threshold.

19. A method of switching a load between a grid power source and an alternative power source, comprising the steps of:
(e) sensing a state of the grid power source;
(f) if the sensing step indicates that power is available from the grid power source then coupling both the grid power source and the alternative power source to the load;
(g) if the sensing step indicates that power is not available from the grid power source then:
 (i) decoupling the grid power source from the load;
 (ii) sensing if the grid power source is decoupled from the load after the step of decoupling the grid power source from the load;
 (iii) if the grid power source is decoupled from the load, then coupling the alternative power source to the load; and
 (iv) if the grid power source is coupled to the load, then decoupling the alternative power source from the load.

20. The method of claim 19, wherein the sensing step comprises the steps of:
(e) sensing a voltage from the grid power source; and
(f) determining that power is not available when the voltage from the grid power source falls below a predetermined threshold.

* * * * *